(12) United States Patent
Kobayashi

(10) Patent No.: US 7,826,852 B2
(45) Date of Patent: Nov. 2, 2010

(54) RADIO COMMUNICATION APPARATUS AND METHOD

(75) Inventor: Takahiro Kobayashi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 753 days.

(21) Appl. No.: 11/879,381

(22) Filed: Jul. 17, 2007

(65) Prior Publication Data

US 2008/0051090 A1 Feb. 28, 2008

(30) Foreign Application Priority Data

Aug. 28, 2006 (JP) .............................. 2006-231146

(51) Int. Cl.
*H04W 72/00* (2009.01)
(52) U.S. Cl. .................. 455/450; 455/436; 370/331
(58) Field of Classification Search .................. 455/450, 455/436; 370/331
See application file for complete search history.

(56) References Cited

FOREIGN PATENT DOCUMENTS

JP 2002-271844 9/2002

OTHER PUBLICATIONS

Suichi Sasaoka, "*Mobile Communication*", Ohmsha, May 25, 1998, Japan, pp. 153 (Section 6.6.2).
Suichi Sasaoka, "Mobile Communication", Ohmsha, May 25, 1998, Japan, pp. 153 (Section 6.6.2) (w/Information Sheet).

*Primary Examiner*—Nghi H Ly
*Assistant Examiner*—Amancio Gonzalez
(74) *Attorney, Agent, or Firm*—Ohlandt, Greeley, Ruggiero & Perle, L.L.P.

(57) ABSTRACT

A radio communication apparatus which communicates with a radio terminal device, the apparatus belonging to a first group, the device performing handoff between apparatuses which belong to the first group, the apparatus includes unit selecting one block from frequency blocks obtained by dividing a specified frequency band, the frequency blocks being continuous on a frequency axis, unit detecting an unused channel among channels contained in the selected block, unit detecting an in-use channel among the channels when the unused channel is detected, unit determining whether a second group to which a device which is using the detected in-use channel belongs is the same as the first group, and unit assigning the detected unused channel as a channel for communication with the radio terminal device when the in-use channel fails to be detected or the determination unit determines that the second group is the same as the first group.

9 Claims, 10 Drawing Sheets

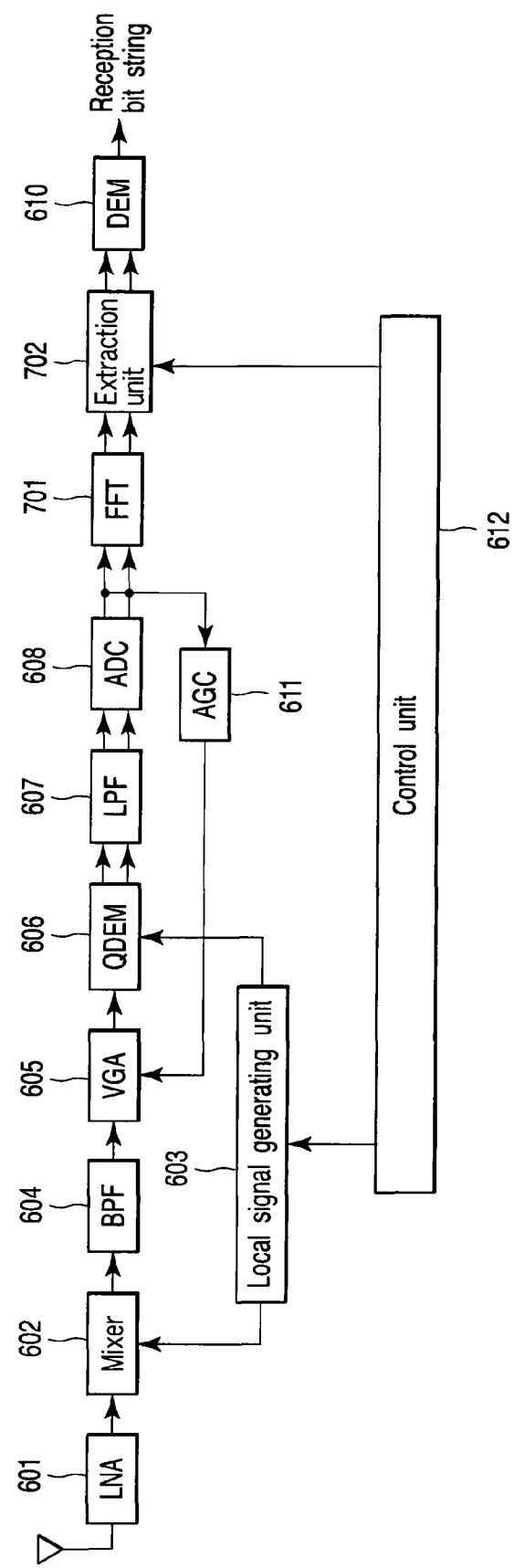
F I G. 7

RADIO COMMUNICATION APPARATUS AND METHOD

CROSS-REFERENCE TO RELATED APPLICATIONS

This application is based upon and claims the benefit of priority from prior Japanese Patent Application No. 2006-231146, filed Aug. 28, 2006, the entire contents of which are incorporated herein by reference.

BACKGROUND OF THE INVENTION

1. Field of the Invention

The present invention relates to a radio communication apparatus and method which perform frequency channel assignment in radio communication.

2. Description of the Related Art

In a cellular radio communication system in which a plurality of base stations are arranged to perform radio communication between themselves and mobile stations, overlaying the communication range of a given base station with that of another adjacent base station to some extent makes it possible to provide two-dimensional communication services for the mobile stations.

There is known a scheme of assigning different frequencies to a given base station and its adjacent base station to prevent communication between the given base station and the first mobile station and communication between the adjacent base station and the second mobile station from interfering with each other when the mobile stations are located in an overlapping area between the communication ranges of the two base stations (see JP-A 2002-271844 (KOKAI)). Although there is available a scheme in which when base stations are installed, available frequency channels are assigned to the respective base stations. In this case, however, it is necessary to install and design base stations in consideration of how the communication ranges to which frequencies are assigned overlap each other.

There is known a technique called DCA (Dynamic Channel Assignment) in which when starting communicating with a mobile station, each base station searches for an unused frequency channel which satisfies conditions, e.g., that the interference level is equal to or less than a predetermined value, and assigns the found frequency channel to the mobile station (see, for example, Shuichi Sasaoka, "Mobile Communication", Ohmsha, p. 153 (section 6.6.2). Using DCA eliminates the necessity to assign frequency channels to the respective base stations in advance. This eliminates necessity to strictly install and design base stations.

The most basic scheme is a method of repeating the operation of selecting an arbitrary channel on a system band, assigning it to a given base station if it is not used, and arbitrarily selecting another channel if the arbitrary channel is used. It is also conceivable to use a method of making each base station measure an interference state for each channel, calculate a priority level corresponding to the interference amount, and search channels with high priority levels for an available channel.

When a received signal is to be demodulated by digital signal processing, the desired signal received at a radio frequency is converted into a baseband signal first, and the signal is then converted into a digital signal by an A/D converter (analog-to-digital converter). The smaller the bit width of the A/D converter, the better in terms of circuit size and power consumption. If, however, the A/D converter receives a signal from a base station B which is much larger than a desired signal from a base station A, since the desired signal component is very small, the A/D converter requires an extra number of bits. If, for example, the reception power difference is 24 dB, the A/D converter requires an extra bit width corresponding to four bits.

In order to avoid this, a receiver incorporates a filter in accordance with the bandwidth of a desired signal to remove channels other than the desired signal by using the filter, thereby inputting a signal component which is mostly the desired signal to the A/D converter.

Assume that DCA is applied to a system in which the bandwidth of a desired signal changes in accordance with a transmission rate. In this case, a problem arises when filters are mounted in the system. In the simplest case, a plurality of filters corresponding to the bandwidth of a desired signal may be mounted in the system, or a variable filter which can be adjusted in accordance with the bandwidth of a desired signal may be mounted in the system. This, however, increases the mount area.

It is also conceivable to use a method of mounting only one filter having the widest bandwidth possible and extracting only a desired signal by performing digital signal processing after A/D conversion if the bandwidth of a desired signal is smaller than that of the filter. In channel assignment by DCA, since a channel used by another base station may exist in the filter band, it is assumed, in particular, that a mobile station is located near base stations belonging to different carriers, as described above. In order to cope with this situation, the A/D converter needs to have an extra number of bits. This increases the mount area or power consumption of the A/D converter.

BRIEF SUMMARY OF THE INVENTION

In accordance with a first aspect of the invention, there is provided a radio communication apparatus which communicates with a radio terminal device, the apparatus belonging to a first group, the device performing handoff between a plurality of apparatuses which belong to the first group, the apparatus comprising: a selection unit configured to select one block from a plurality of frequency blocks obtained by dividing a specified frequency band, the frequency blocks being continuous on a frequency axis; a first detection unit configured to detect an unused channel among a plurality of channels contained in the selected block; a second detection unit configured to detect an in-use channel among the channels when the unused channel is detected; a determination unit configured to determine whether a second group to which a device which is using the detected in-use channel belongs is the same as the first group; and an assignment unit configured to assign the detected unused channel as a channel for communication with the radio terminal device when the in-use channel fails to be detected or the determination unit determines that the second group is the same as the first group.

In accordance with a second aspect of the invention, there is provided a base station which communicates with a radio terminal device, the station belonging to a first group, the device performing handoff between a plurality of stations s which belong to the first group, the computer system comprising: means for selecting one block from a plurality of frequency blocks obtained by dividing a specified frequency band, the frequency blocks being continuous on a frequency axis; means for detecting an unused channel among a plurality of channels contained in the selected block; means for detecting an in-use channel among the channels when the unused channel is detected; means for determining whether a second group to which a device which is using the detected in-use channel belongs is the same as the first group; and means for assigning the detected unused channel as a channel for communication with the radio terminal device when the in-use channel fails to be detected or it is determined that the second group is the same as the first group.

BRIEF DESCRIPTION OF THE SEVERAL VIEWS OF THE DRAWING

FIG. 7 is a block diagram of a mobile station in a case wherein an OFDM signal is received;

DETAILED DESCRIPTION OF THE INVENTION

A radio communication apparatus and method according to an embodiment will be described in detail below with reference to the views of the accompanying drawing.

The radio communication apparatus and method according to the embodiment can be applied to a system in which the bandwidth of a desired signal changes in accordance with a transmission rate, and can reduce the mount areas and power consumptions of the radio units of a base station and mobile station.

Figure 1:
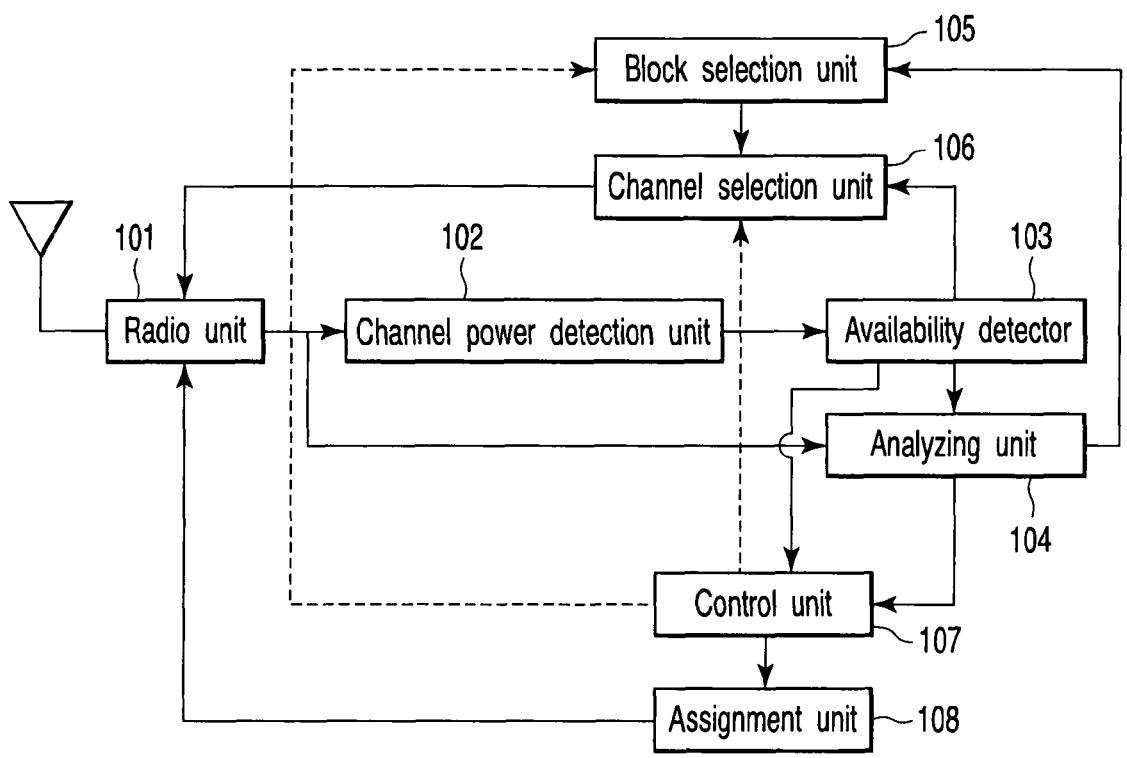
FIG. 1 is a block diagram of a radio communication apparatus according to an embodiment.

The arrangement of the radio communication apparatus according to the embodiment will be described with reference to FIG. 1. Although the radio communication apparatus in FIG. 1 may be either a base station or a mobile station, it is assumed that the radio communication apparatus is a base station in this case. A case wherein the radio communication apparatus in FIG. 1 is a mobile station will be described later with reference to FIG. 12.

The radio communication apparatus of this embodiment comprises a radio unit 101, channel power detection unit 102, availability detector 103, analyzing unit 104, block selection unit 105, channel selection unit 106, control unit 107, and assignment unit 108.

The radio unit 101 performs communication processing between a mobile station and another base station. More specifically, the radio unit 101 receives an assignment request from a mobile station. The radio unit 101 sets, in it, the channel selected by the channel selection unit 106, and receives a signal through the channel. The radio unit 101 receives an assigned channel from the assignment unit 108 and notifies the mobile station by using a predetermined assignment notification channel that the assigned channel is assigned to the mobile station. The radio unit 101 performs reception processing of a known pattern. Using this known pattern allows the analyzing unit 104 to determine whether the signal is received from the same group.

The channel power detection unit 102 measures a signal level from a mobile station or another base station to detect the power of the channel, and transfers the power value to the availability detector 103. The channel power detection unit 102 calculates, for example, the average of the sum of the squares of sample data, and transfers the average value to the availability detector 103. Since this average value is proportional to the signal power, the availability detector 103 receives a value proportional to the channel power.

The availability detector 103 performs available channel detection to assign a new channel from the same block. For example, the availability detector 103 receives a power value from the channel power detection unit 102, and compares the power value with a threshold to determine whether this channel is available. If a power value in a given channel is equal to or less than a predetermined threshold level, the availability detector 103 recognizes the channel as an available channel. If the power value is equal to or more than the threshold, the availability detector 103 determines the channel is in use. In addition, the availability detector 103 performs available channel detection in all blocks.

The analyzing unit 104 checks whether there is any signal from another base station/mobile station within the same block. If there is a signal, the analyzing unit 104 analyzes the signal in the block, and determines whether the signal is transmitted from a base station/mobile station belonging to the same group. The analyzing unit 104 receives a signal through the in-use channel which the radio unit 101 has received, and analyzes the received signal. For example, known patterns contained in signals are associated in advance with groups to which base stations/mobile stations belong. By performing reception processing for a known pattern, the analyzing unit 104 can determine whether the signal is received from the same group. Assume that the transmission timings of base stations/mobile stations belonging to the same group are synchronous with each other and are basically asynchronous with those of other groups. In this case, the analyzing unit 104 identifies the transmission timing of a signal. If the identified timing falls within an allowable error range with respect to the timing of the self station, the analyzing unit 104 can determine that the signal is received from the same group. If the identified timing is equal to or more than the allowable range, the analyzing unit 104 can determine that the signal is received from another group.

The block selection unit 105 selects one block from a plurality of blocks. For example, selection methods include a method (A) of randomly selecting a block, a method (B) of selecting a block to which a channel has already been assigned, and a method (C) of selecting a block in which a signal from a base station belonging to the same group as that to which the self station belongs is detected at the time of previous check. The details of these methods will be described later with reference to FIG. 2.

The channel selection unit 106 selects one of a plurality of channels contained in the block selected by the block selection unit 105. When the availability detector 103 detects that the channel is in use, the channel selection unit 106 selects another channel from the block, and informs the channel to the radio unit 101.

The control unit 107 performs overall control. If, for example, there is no available channel in the block, the control unit 107 instructs the block selection unit 105 to execute block selection again. If the availability detector 103 determines that all the channels in the block are available channels, the control unit 107 determines to use a previously detected available channel.

If signal analysis on an in-use channel indicates that the signal is from a base station/mobile station belonging to the same group, the assignment unit 108 determines to assign the previously detected available channel, and informs it to the radio unit 101. Note that the bandwidth of the channel assigned by the assignment unit 108 changes in accordance with the rate of information to be transmitted.

Figure 2:
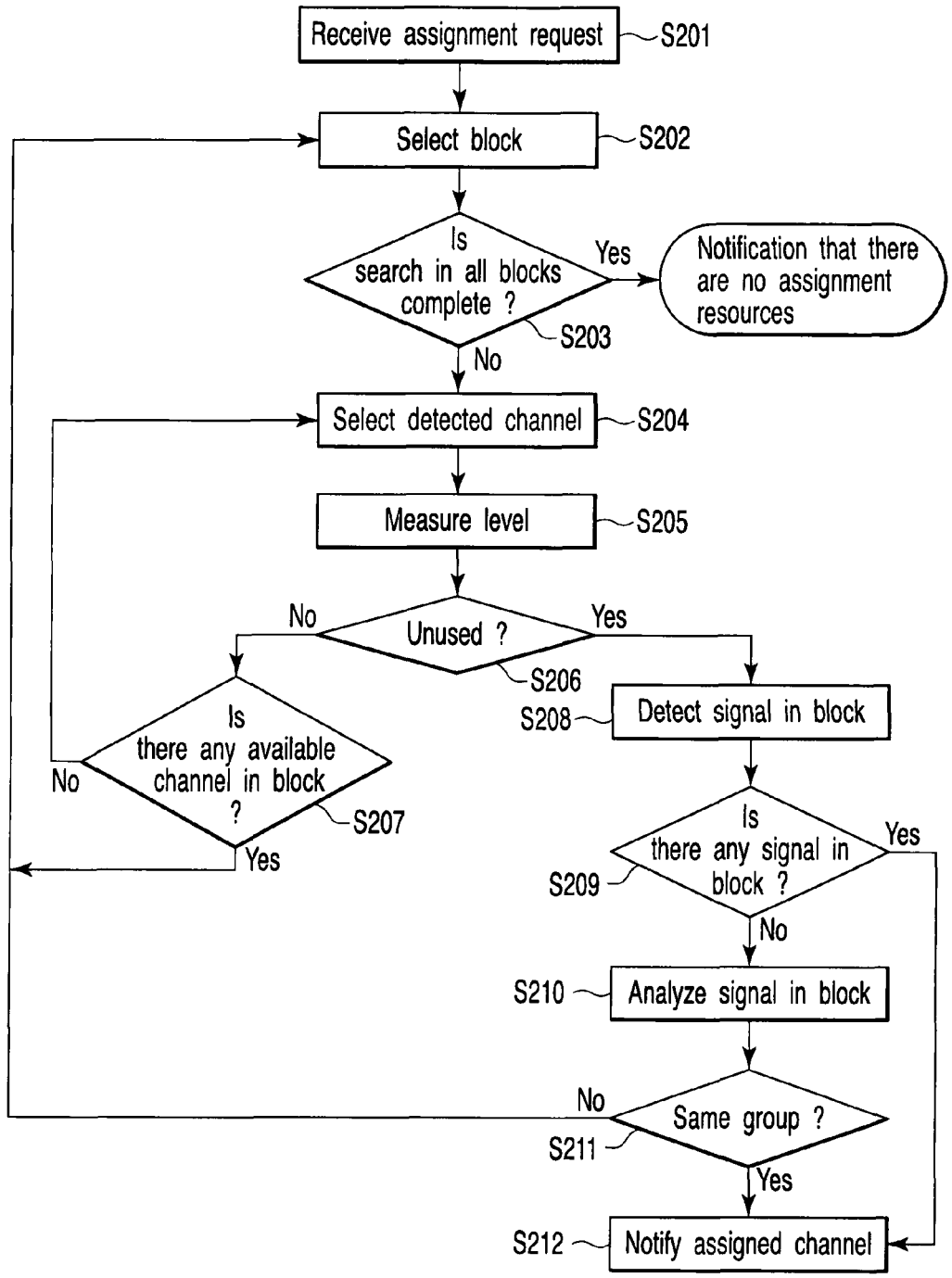
FIG. 2 is a flowchart showing an example of the operation of a base station when the apparatus in FIG. 1 is the base station.

An example of the operation of the radio communication apparatus (base station) in FIG. 1 will be described next with reference to FIG. 2. FIG. 2 shows an example of a channel assignment procedure in this embodiment.

A case wherein a channel assignment request is issued before the start of communication will be described. When issuing a channel assignment request, the mobile station notifies the base station of the request by using a predetermined request notification channel. In the base station, the radio unit 101 receives the assignment request (step S201).

In the base station which has received the assignment request, the block selection unit 105 selects a proper block (step S202). For example, block selection methods include:

a method (A) of randomly selecting a block;

a method (B) of selecting a block to which a channel has already been assigned; and a method (C) of selecting a block in which a signal from a base station belonging to the same group as that to which the self station belongs is detected at the time of previous check. The most basic method is the method (A) of randomly selecting a block. If, however, the number of blocks contained in a system band is not very many relative to the total number of base stations arranged in a given area or an expected channel usage rate, the number of blocks which use only some channels increases, resulting in a deterioration in frequency use efficiency in terms of the overall system band.

If there is already a channel used for communication with a given mobile station, the block selection unit 105 uses the block selection method (B) in which the availability detector 103 performs available channel detection for assigning a new channel from the same block. This allows dense use of channels within the block, and hence is advantageous for frequency use efficiency in terms of the overall system band. Suppressing the occurrence of blocks whose usage rates are low makes it possible to prevent a deterioration in frequency use efficiency.

The method (C) is a method of storing the history of past available channel detection/used channel detection in a memory (not shown) in advance and making the block selection unit 105 preferentially select a block in which there is a signal from a base station belonging to the same group as that to which the self station belongs on the basis of the history. It is conceivable to apply this method to a case wherein the base station does not communicate with another mobile station or a case wherein the base station performs communication and it is known that there is no available channel in the block in use. Selecting a block which is used by a base station belonging to the same group as that to which the self station belongs at a high probability makes it possible to shorten the processing time up to assignment. In addition, using a block as densely as possible for each group can prevent a reduction in unused blocks and allows a plurality of groups to equally share the overall system band. In this case, a group indicates a group which allows a base station and a mobile station, which belong to the group, to perform handoff.

Assume that upon performing available channel detection within all blocks (step S203), the availability detector 103 detects that all channels are in use or an available channel exists only in a block used by another group. In this case, the base station cannot assign any channel to the mobile station which has issued the request, and hence notifies the mobile station of the corresponding information.

If there is still any block which can be selected, the channel selected by the channel selection unit 106 is set in the radio unit 101, and the channel power detection unit 102 detects the power of the channel. The availability detector 103 receives this power value and compares it with a threshold to determine whether this channel is available. The availability detector 103 executes available channel detection for each channel in the selected block (steps S204 to S206). As an available channel detection method, it is conceivable to use, for example, a method of causing the channel power detection unit 102 to measure a signal level from another mobile station or another base station (step S205), and causing the availability detector 103 to recognize the channel as an available channel if the measured level is equal to or less than a predetermined threshold level, or determine, if the measured level is equal to or more than the threshold, that the channel is in use (step S206).

This threshold level is generally made the same throughout the base stations to maintain the fairness of channel assignment. Since, for example, the proper threshold level in a base station in an area with high traffic may differ from that in a base station in an area with low traffic, it is conceivable to take countermeasures, e.g., introducing a plurality of threshold levels or dynamically changing a threshold level.

If there is no available channel in the block, the control unit 107 instructs the block selection unit 105 to execute block selection again (step S207).

If the availability detector 103 determines that there are one or more available channels in the block (step S208), it is checked whether there is a signal from another base station/mobile station in the same block (steps S209 and S210). If there is such a signal, the analyzing unit 104 analyzes the signal in the block (step S210) to determine whether the signal is from a base station/mobile station belonging to the same group (step S211). In contrast to this, if the availability detector 103 determines that all the channels in the block are available channels, the control unit 107 determines to use a previously detected available channel, and the radio unit 101 notifies the mobile station of the assignment of the channel by using a predetermined assignment notification channel (step S212).

The following method may be used as a determination method in step S211.

The radio unit 101 receives a signal through an in-use channel, and the analyzing unit 104 analyzes the received signal. For example, a known pattern contained in a signal is made to correspond in advance with a group to which a base station/mobile station belongs. That is, different known patterns indicate different groups, and vise versa. Causing the radio unit 101 and the analyzing unit 104 to perform reception processing for the known pattern makes it possible to determine whether the signal is from the same group. Introducing an element capable of identifying a group in a physical channel can perform quick group identification without performing group identification based on upper layer information such as a base station ID.

Examples of known patterns include various kinds of patterns such as a bit pattern of a unique word on a physical layer format in, for example, a PHS, a specific spreading code such as a synchronization channel (SCH) in a W-CDMA, a specific time waveform, and a specific frequency pattern.

According to another method, assume that the transmission timings (e.g., the frame timing phases) of base stations/mobiles station belonging to the same group are synchronous with each other, and are basically asynchronous with those of other groups. In this case, the analyzing unit 104 identifies the transmission timing of a signal and compares it with the timing of the self station. If the difference between them falls within an allowable error range, the analyzing unit 104 can determine that the signal is from the same group. If the difference is equal to or more than the allowable error range, the analyzing unit 104 can determine that the signal is from another group. Since the identified timing may coincide with the timing of a different group in terms of probability, it is preferable to use this technique together with the technique of checking by using a known signal pattern. Using both the techniques can shorten the check time because there is no need to make an unnecessary check.

Assume that when signal analysis on an in-use channel is performed in accordance with the above procedure, it is determined that the signal is from a base station/mobile station belonging to the same group. In this case, the assignment unit 108 determines to assign the previously detected available channel, and the radio unit 101 notifies the mobile station of the assignment of the channel by using a predetermined assignment notification channel.

Upon determining that there is a signal from another group, the control unit 107 instructs the block selection unit 105 to select another block, thereby executing available channel detection again.

An example of a state wherein channels are assigned along the frequency axis by the method in this embodiment will be described next with reference to FIG. 3.

Figure 3:
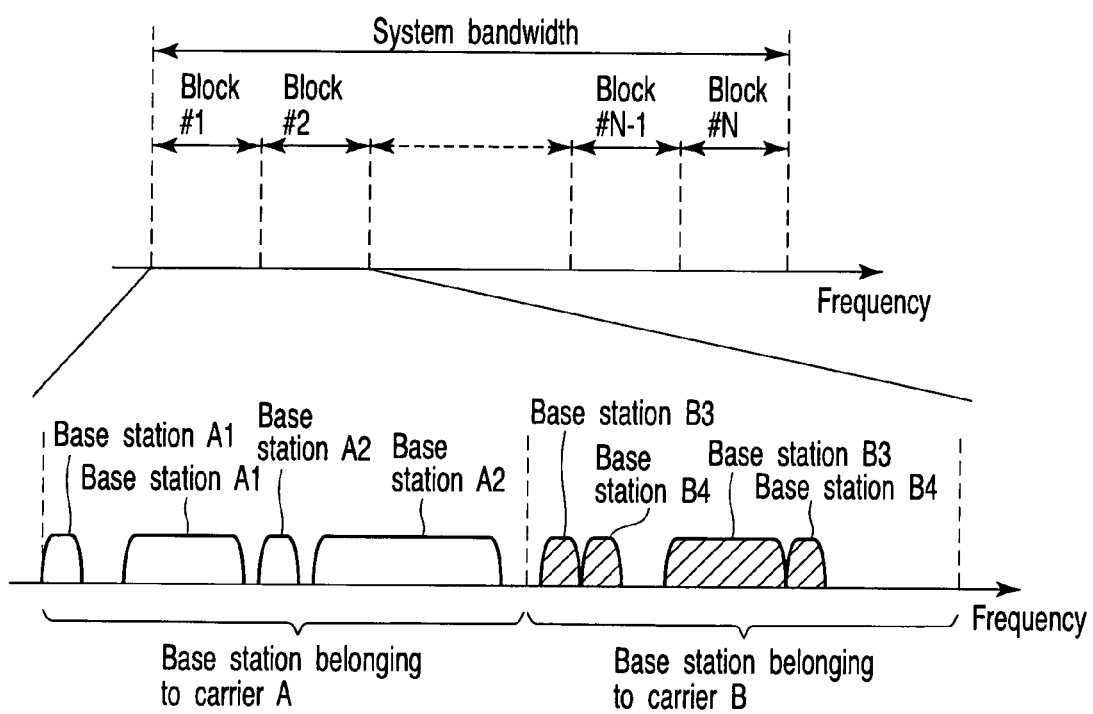
FIG. 3 is a view showing an example of a channel assignment state on the frequency axis which is set by a channel assignment method according to this embodiment.

A radio system using this proposal is operated on the frequencies of the system band in FIG. 3. The system band is divided into a plurality of blocks. The bandwidths of the respective blocks may be the same or different from each other. Each base station uses a channel contained in any one of the blocks to communicate with a mobile station. The bandwidth of a channel which the assignment unit 108 assigns changes depending on the rate of information to be transmitted.

When channel assignment is executed in accordance with the channel assignment procedure shown in FIG. 2, only signals from base stations/mobile stations belonging to the same group exist in one block, as indicated by the lower side of FIG. 3. Although one block contains a plurality channels with different bandwidths, they belong to the same group. When base stations/mobile stations belonging to the same carrier are handled as the same group, only signals from base stations/mobile stations belonging to one carrier exist in one block.

Figure 4A:
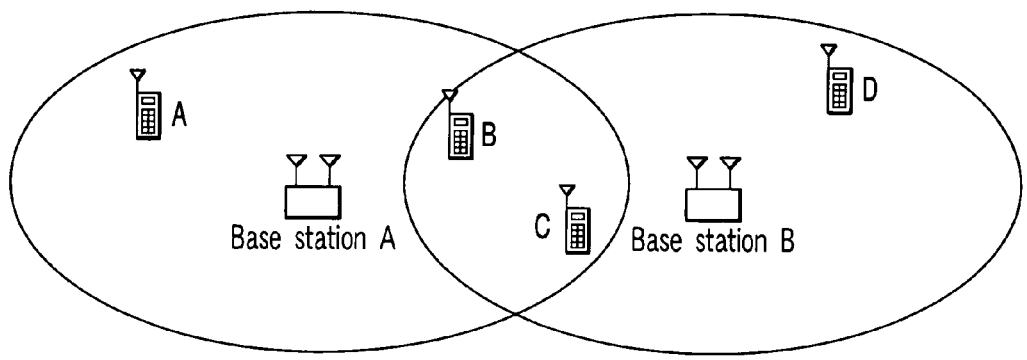
FIG. 4A is a view showing the positional relationship between base stations and mobile stations in a case wherein the two base stations belong to different carriers.
Figure 4B:
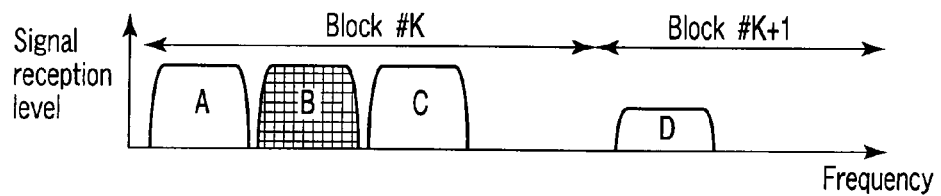
FIG. 4B is a view showing the reception level of a signal which a mobile station B shown in FIG. 4A receives.
Figure 4C:
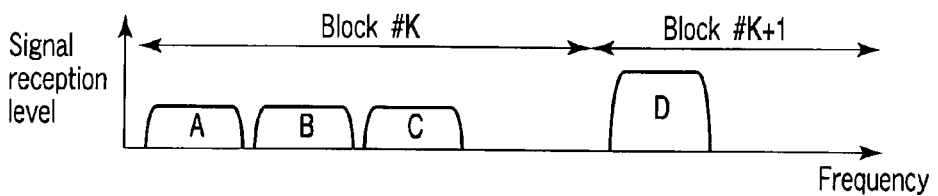
FIG. 4C is a view showing the reception level of a signal which a mobile station C shown in FIG. 4A receives.

The reception powers of mobile stations B and C in communication with a base station A at the respective positions in a case wherein the base station A and a base station B belong to different carriers (i.e., a mobile station cannot perform handoff between the base stations A and B) will be described with reference to FIGS. 4A, 4B, and 4C. FIG. 4B shows the signal reception level of the mobile station B shown in FIG. 4A. FIG. 4C shows the signal reception level of the mobile station C shown in FIG. 4A.

At the positions of the mobile stations B and C, signals from two base stations are observed. At the position of the mobile station B, the signal from the base station A, which is a desired signal, is larger than the signal transmitted from the base station B and addressed to a mobile station D. At the position of the mobile station C, the signal addressed to the mobile station D is larger than the signal from the base station A.

If the signal addressed to the mobile station D is contained in the same block as that in which the desired signal from the mobile station C is contained, the signal addressed to the mobile station D is very large and dominant at the position of the mobile station C, and an AGC (Auto Gain Controller) 611 included in the mobile station shown in FIG. 6 to be described later performs control in response to the signal addressed to the mobile station D. If, however, channel assignment based on this embodiment is performed, since base stations belonging to different carriers use different blocks and any signals addressed to the mobile station D can be removed by a BPF 604 in advance, the channel assignment has no influence on control by the AGC 611. Signals addressed to the mobile stations A and B which should be removed by a BPF 609 are equal to or lower in level than a desired signal C, and hence can be easily removed by a digital filter.

The reception powers of the mobile stations B and C in communication with the base station A at the respective positions in a case wherein the two base stations A and B belong to the same carrier will be described with reference to FIGS. 5A, 5B, and 5C. FIG. 5B shows the signal reception level of the mobile station B shown in FIG. 5A. FIG. 5C shows the signal reception level of the mobile station C shown in FIG. 5A.

In this case, a mobile station can perform handoff to a base station having larger reception power. Therefore, at the position of the mobile station C, it receives a signal from the base station B instead of a signal from the base station A. Referring to FIGS. 5B and 5C, signals addressed to all the mobile stations exist together in one block. In this case as well, signals to be removed by the BPF 609 are smaller than the desired signal C, and hence can be easily removed by a digital filter.

The arrangement of a mobile station according to this embodiment will be described next with reference to FIG. 6. The mobile station shown in FIG. 6 is an example of the arrangement of the reception system of a mobile station based on the assumption that channel assignment is performed. This mobile station is a conventional one. The arrangement of this station will be briefly described below.

Figure 6:
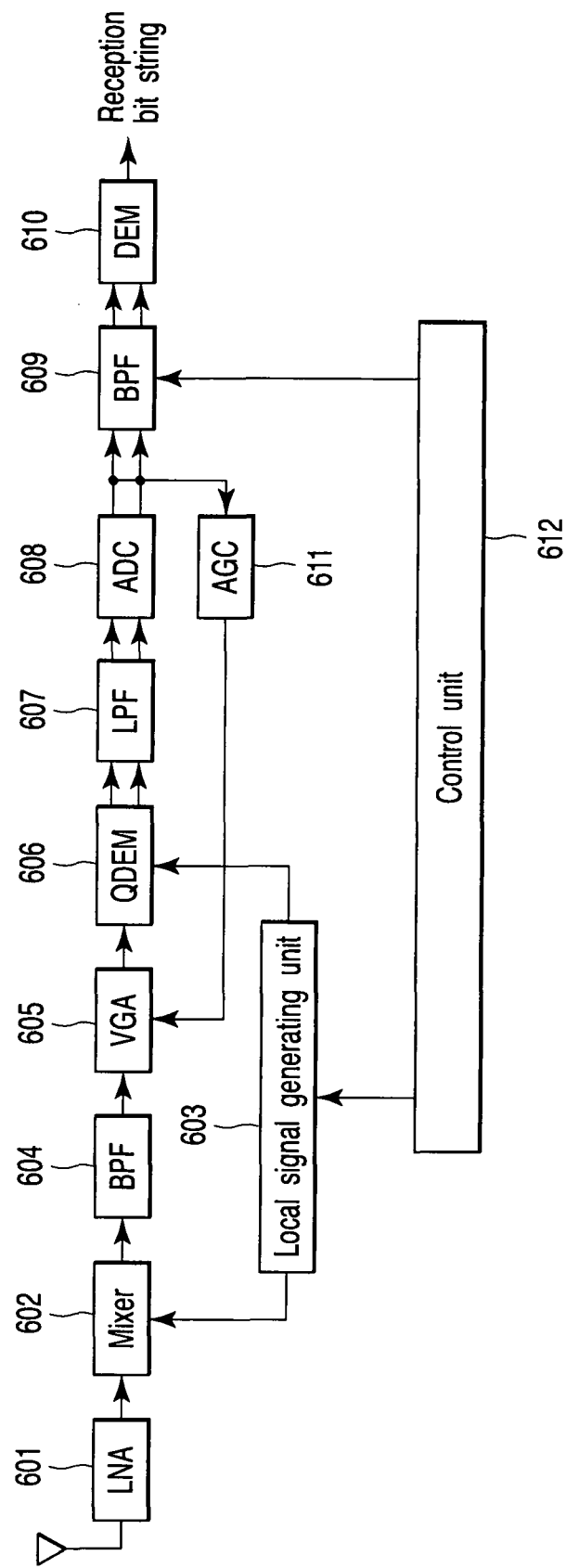
FIG. 6 is a block diagram of a mobile station.

The mobile station in FIG. 6 comprises an LNA (Low-Noise Amplifier) 601, a mixer 602, a local signal generating unit 603, a BPF (Band-Pass Filter) 604, a VGA (Variable Gain Amplifier) 605, a QDEM (quadrature demodulator) 606, an LFP (Low-Pass Filter) 607, an ADC (Analog-to-Digital Converter) 608, the BPF 609, a DEM (demodulator) 610, the AGC 611, and a control unit 612.

The LNA 601 amplifies the signal received through the antenna. The LNA 601 is a low-noise amplifier. The mixer 602 converts the frequency of the received signal such that the center frequency of one block containing a desired channel overlaps the center frequency of the BPF 604. The local signal generating unit 603 generates a reference signal required for frequency conversion so as to extract a signal from a desired block under the control of the control unit 612, and supplies the signal to the mixer 602. The BPF 604 has characteristics that attenuate signals other than those contained in the desired block. Therefore, an output from the BPF 604 contains only the desired signal and a signal from a base station belonging to the same group.

The VGA 605 is a variable gain amplifier, which adjusts the amplification degree under the control of the AGC (Automatic Gain Controller) 611. The QDEM 606 is a quadrature demodulator, which converts the frequency of an output from the VGA 605 to convert it into a baseband quadrature signal. The local signal generating unit 603 supplies a reference signal for conversion. The LPF 607 extracts a signal from the desired channel by filtering the quadrature-demodulated signal. The ADC 608 converts the output signal from the LPF 607 into a digital signal. The AGC 611 calculates the signal power equivalent of the output signal from the ADC 608, and determines the gain of the VGA 605 so as to set the signal power equivalent to a proper level. Since the output from the ADC 608 contains all the signals in one block, the VGA 605 is controlled in accordance with the total reception power of one block. The BPF 609 is a digital filter for extracting only a signal from the desired channel. The BPF 609 extracts a signal corresponding to the bandwidth of the desired channel from the frequency of the desired channel in the block. The control unit 612 controls, for example, the channel position at which the BPF 609 extracts a signal. The DEM (demodulator) 610 performs demodulation processing in accordance with the modulation scheme of the desired signal to generate a reception bit string. Although the above arrangement may sometimes include an error correction function and the like, the details of such functions are irrelevant to this embodiment, and hence a description thereof will be omitted. Note that the BPF 604 and the LPF 607 may have the same filter bandwidth or may have different filter bandwidths. When they have different bandwidths, for example, the filter bandwidth of the BPF 604 is large (for example, corresponding to 100 times the channel bandwidth), and the filter bandwidth of the LPF 607 is small (for example, equal to the channel bandwidth).

Conventionally, at least one of the BPF 604 and the LPF 607 needs to have a variable filtering band. According to the radio communication apparatus of this embodiment, mounting a block-basis analog filter in the receiver of a base station/mobile station makes it possible to remove signals from base stations/mobile stations belonging to other carriers. The receiver therefore need not always have a variable filter.

The arrangement of a mobile station in a case wherein a base station uses OFDM as a transmission signal format will be described next with reference to FIG. 7. In this case, the mobile station comprises a fast Fourier transformer (FFT) 701 and an extraction unit 702 in place of the BPF 609. The same reference numerals as those of the components of the apparatus described above denote the same components, and a description thereof will be omitted.

In this case, as shown in FIG. 7, the FFT 701 converts a signal into a frequency domain signal in place of the BPF 609, and the extraction unit 702 extracts only a desired subcarrier, thereby further simplifying the arrangement.

Figure 5A:
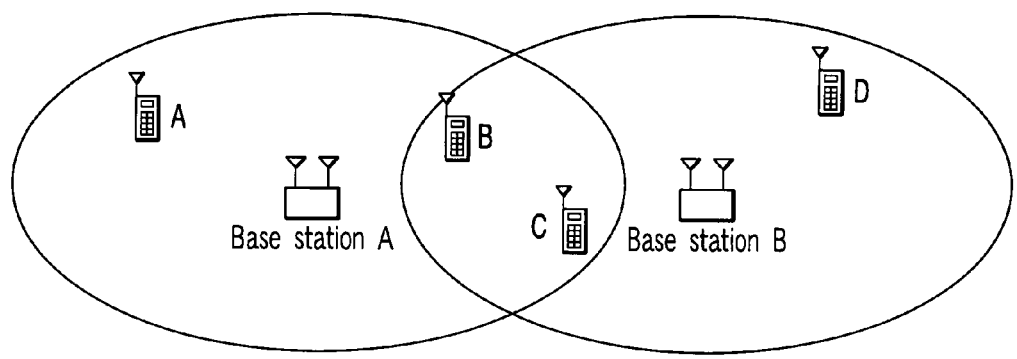
FIG. 5A is a view showing the positional relationship between base stations and mobile stations in a case wherein the two base stations belong to different carriers.
Figure 5B:
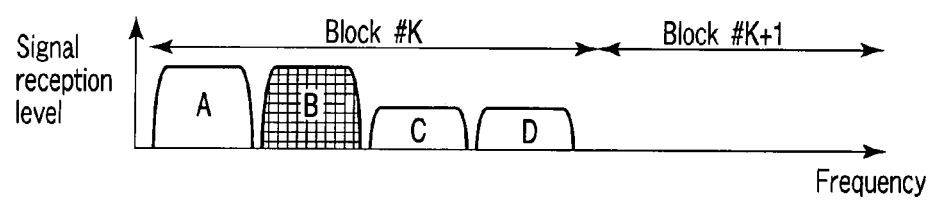
FIG. 5B is a view showing the reception level of a signal which a mobile station B shown in FIG. 5A receives.
Figure 5C:
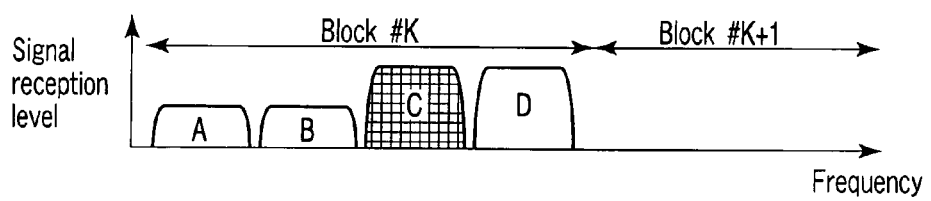
FIG. 5C is a view showing the reception level of a signal which a mobile station C shown in FIG. 5A receives.
Figure 8:
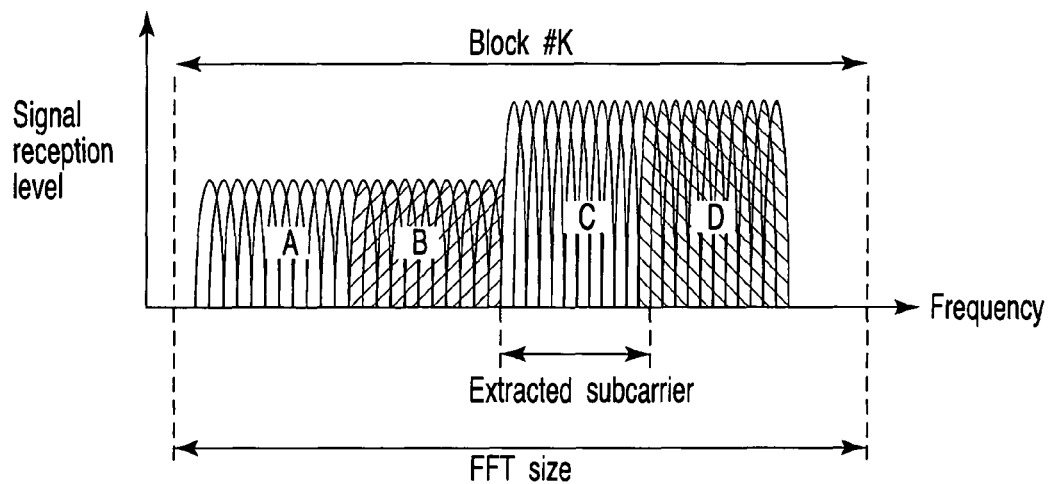
FIG. 8 is a view showing the reception level of a signal which a mobile station C shown in FIG. 5A receives in the case of an OFDM signal.

More specifically, in the placement of the base stations and mobile stations in FIG. 5A, signals from the base stations A and B become those shown in FIG. 8 at the position of the mobile station C. In the mobile station C, the FFT 701 executes FFT with the block frequency width. Thereafter, the extraction unit 702 demodulates only the subcarrier addressed to the self station. The transmission rate of signals addressed to the mobile station C can be easily attained by switching the numbers of subcarriers to be assigned.

A problem in the conventional radio communication apparatus and a solution to the problem which is provided by this embodiment will be briefly described below.

Figure 9:
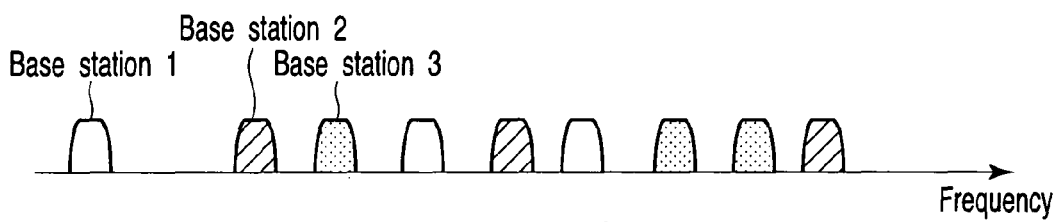
FIG. 9 is a view showing how channels which base stations are using are dispersed in a system band according to the prior art.

Conventionally, according to DCA, an available channel is searched out with an arbitrary frequency in the system band, and is assigned to communication with a mobile station. If the system band is observed at a given point, the channels used by one base station are dispersed in the system band. Therefore, as shown in FIG. 9, the channels used by a plurality of base stations exist together on the frequency axis.

According to the radio communication apparatus of this embodiment, as indicated by the lower side of FIG. 3, one block can be made to contain only signals from base stations/mobile stations belonging to the same group. In this case, although one block contains a plurality of channels with different bandwidths, all belong to the same group.

Figure 10A:
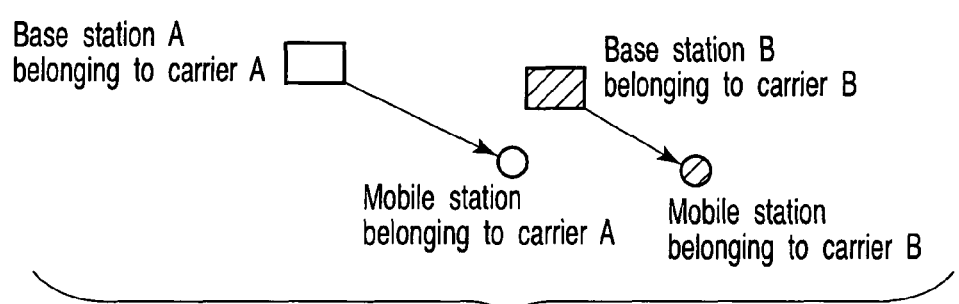
FIG. 10A is a view showing a state wherein a base station nearest to a mobile station is not a base station belonging to a carrier to which the mobile station can connect.

Signals which a mobile station receives will be briefly described next in consideration of the positional relationship between a base station and the mobile station. In a cellular mobile communication system, since a mobile station moves to an arbitrary position, a mobile station in communication with a given base station may move to a position near another base station. As in a PHS (Personal Handy-phone System), when a plurality of carriers share one system band by using DCA, since the respective carriers independently install base stations in the same area, a base station nearest to a mobile station may not be a base station to which the mobile station can connect, as shown in FIG. 10A.

Figure 10B:
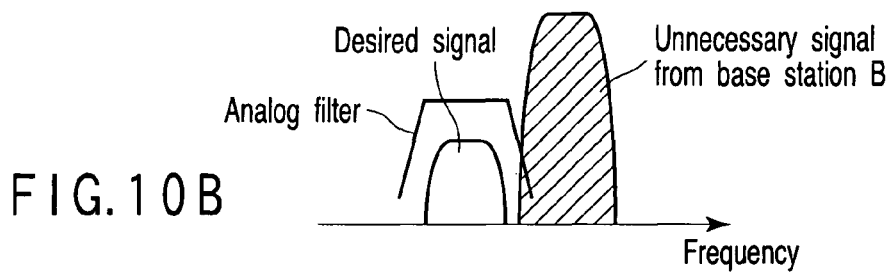
FIG. 10B is a state wherein the intensity of a signal from a base station to which a mobile station cannot connect exceeds the intensity of a desired signal from a base station to which the mobile station can connect.

Conventionally, when the base station B is using a channel close to the channel which the mobile station is using, the intensity of a signal from the base station B is higher than that of a desired signal from the base station A at the antenna end of the mobile station A, as shown in FIG. 10B. The difference between these signals may become very large, as large as 20 dB to 30 dB. Since the mobile station A cannot generally connect to the base station B belonging to the different carrier, this state continues as long as the mobile station A moves away from the base station B.

When the radio communication apparatus (base station) according to this embodiment performs channel assignment, since base stations belonging to different carriers use different blocks, and signals addressed to the mobile station D can be removed in advance by the BPF 604, such signals have no influence on the control performed by the AGC 611. Signals addressed to the mobile stations A and B which should be removed by the BPF 609 are equal to or lower in level than the desired signal C, and hence can be easily removed by a digital filter.

Another example of the flowchart for the channel assignment method shown in FIG. 2 will be described next with reference to FIG. 11. The same reference numerals as those of the steps described above denote the same steps, and a description thereof will be omitted.

It is determined whether a given block contains an already assigned channel (step S1101). If the given block contains an already assigned channel and also contains an available channel, the assigned block is selected (step S1102). If there are a plurality of assigned blocks, the block selection unit 105 selects one of them. The same selection method as that described above is used. If there is only one assigned block, the block selection unit 105 selects the block. Detecting an available channel and quickly assigning it to a mobile station can omit the procedure of signal detection/analysis on an in-use channel (steps S208 to S211).

Figure 11:
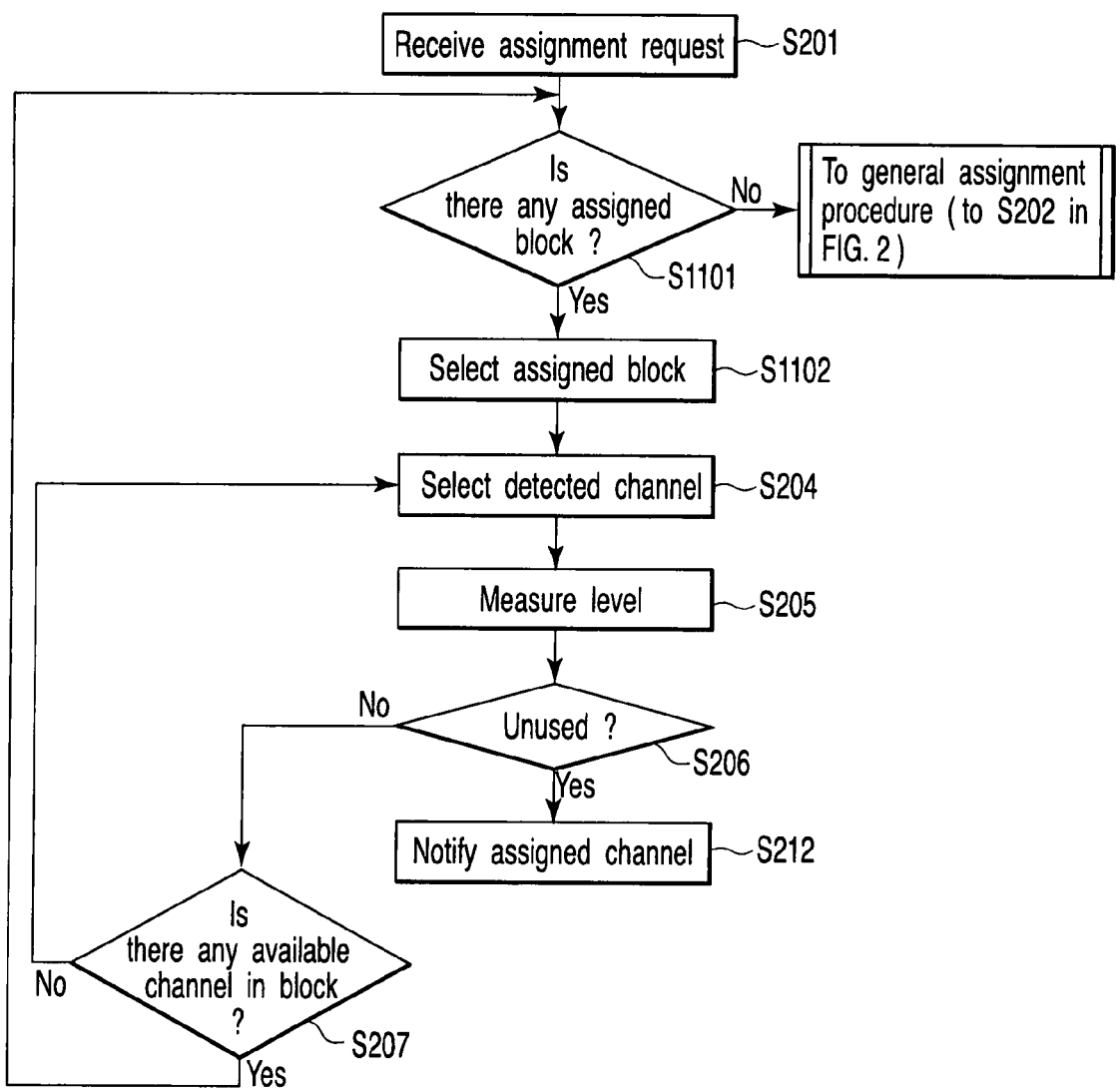
FIG. 11 is a flowchart as another example of the flowchart of FIG. 2.

The procedures shown in FIGS. 2 and 11 are executed to perform available channel detection, group-basis determination for an in-use channel, and the like after the issuance of an assignment request. In contrast to this, it is conceivable to use a procedure of periodically executing available channel search independently of the issuance of a channel assignment request, generating an assignable channel list in advance, and when an assignment request is issued, starting to check, in the descending order of the list, whether there is any available channel. This procedure can shorten the delay time between the issuance of a channel assignment request and the notification of channel assignment.

Figure 12:
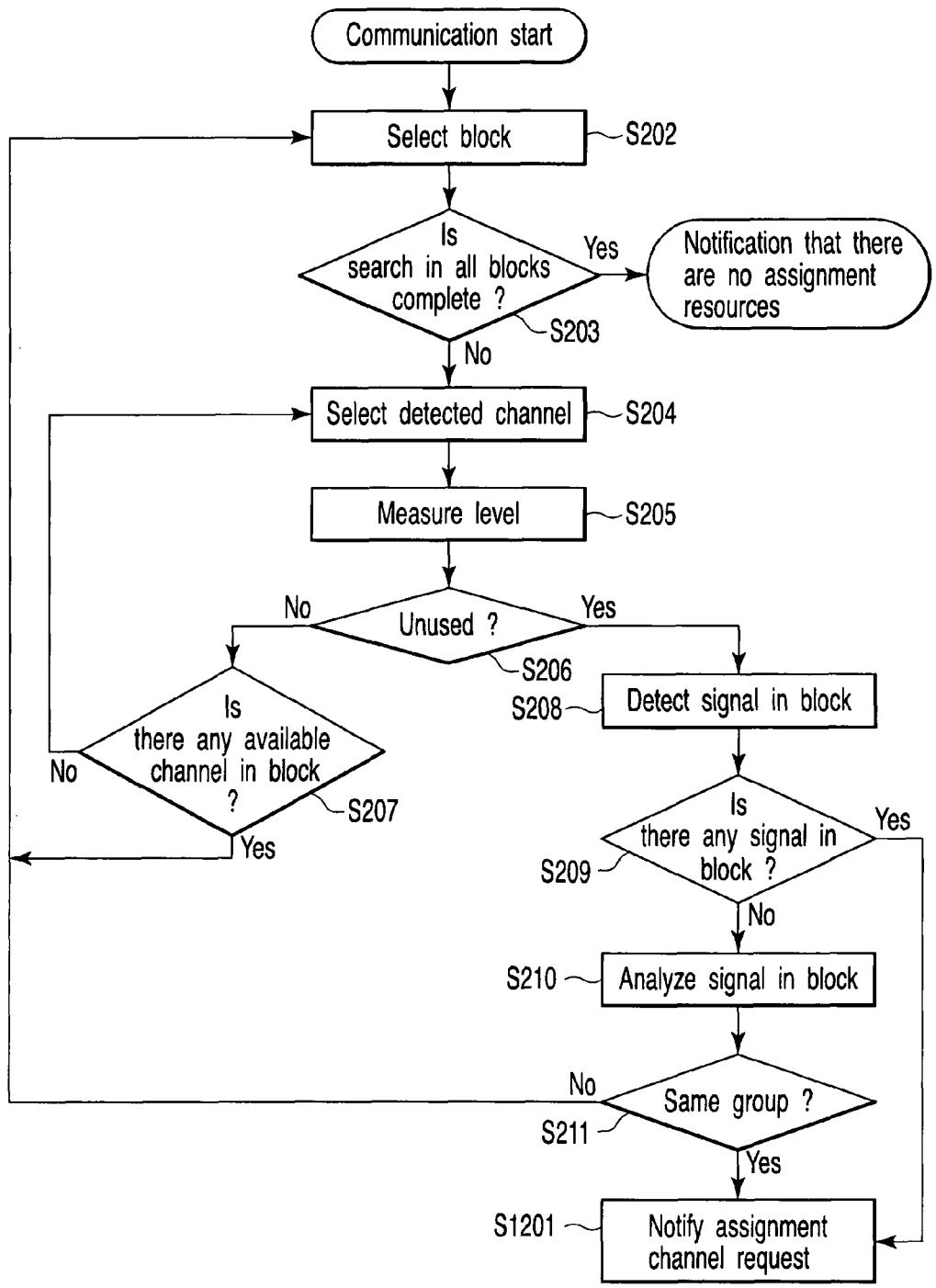
FIG. 12 is a flowchart showing an example of the operation of a mobile station when the apparatus in FIG. 1 is the mobile station.

An example of the operation of a mobile station in a case wherein the radio communication apparatus in FIG. 1 is the mobile station will be described next with reference to FIG. 12.

When the mobile station starts communication, the process shifts to step S202. The operation up to step S211 is the same as that in the flowchart of FIG. 2. Finally, an assignment channel request is notified to a base station (step S1201).

According to the above embodiment, forming a state wherein only base stations/mobile stations belonging to one group use one block makes it possible to form a state equivalent to the operation of dividing a specified frequency band on a carrier basis while effectively using frequencies in accordance with the traffic or base station placement of each carrier assuming that each carrier is considered as a group. In this state, mounting a block-basis analog filter in the receiver of a base station/mobile station can remove signals from base stations/mobile stations belonging to other carriers. This makes it possible to easily form a receiver corresponding to a system which changes the channel bandwidth in accordance with the transmission rate of information. As a consequence, the mount area and power consumption of each of the radio units of base stations and mobile stations can be reduced as compared with the prior art.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio communication apparatus which communicates with a radio terminal device, the apparatus belonging to a first group, the device performing handoff between a plurality of apparatuses which belong to the first group, the apparatus comprising:
   a selection unit configured to select one block from a plurality of frequency blocks obtained by dividing a specified frequency band, the frequency blocks being continuous on a frequency axis;
   a first detection unit configured to detect an unused channel among a plurality of channels contained in the selected block;
   a second detection unit configured to detect an in-use channel among the channels when the unused channel is detected;
   a determination unit configured to determine whether a second group to which a device which is using the detected in-use channel belongs is the same as the first group; and
   an assignment unit configured to assign the detected unused channel as a channel for communication with the radio terminal device when the in-use channel fails to be detected or the determination unit determines that the second group is the same as the first group.

2. The apparatus according to claim 1, wherein the selection unit selects a block used for communication with a radio terminal device with which communication has already been made in preference to other blocks.

3. The apparatus according to claim 1, wherein the selection unit comprises
   a storage unit configured to store a channel through which communication is made with a device belonging to the first group, and
   a selection unit configured to select a block containing the stored channel.

4. The apparatus according to claim 1, wherein the determination unit comprises
   a detection unit configured to detect a known pattern which is contained in a signal on the in-use channel and associated with a group, and
   a determination unit configured to determine whether the group indicated by the known pattern is the same as the first group.

5. A channel assignment method used in a radio communication apparatus which communicates with a radio terminal device, the apparatus belonging to a first group, the device performing handoff between a plurality of apparatuses which belong to the first group, the method comprising:
   selecting one block from a plurality of frequency blocks obtained by dividing a specified frequency band, the frequency blocks being continuous on a frequency axis;
   detecting an unused channel among a plurality of channels contained in the selected block;
   detecting an in-use channel among the channels when the unused channel is detected;
   determining whether a second group to which a device which is using the detected in-use channel belongs is the same as the first group; and
   assigning the detected unused channel as a channel for communication with the radio terminal device when the in-use channel fails to be detected or it is determined that the second group is the same as the first group.

6. The method according to claim 5, wherein selecting the one block includes selecting a block used for communication with a radio terminal device with which communication has already been made in preference to other blocks.

7. The method according to claim 5, wherein selecting the one block comprises
   preparing a storage unit configured to store a channel through which communication is made with a device belonging to the first group, and
   selecting a block containing the stored channel.

8. The method according to claim 5, wherein the determining comprises
   detecting a known pattern which is contained in a signal on the in-use channel and associated with a group, and
   determining whether the group indicated by the known pattern is the same as the first group.

9. A base station which communicates with a radio terminal device, the station belonging to a first group, the device performing handoff between a plurality of stations which belong to the first group, the base station comprising:

means for selecting one block from a plurality of frequency blocks obtained by dividing a specified frequency band, the frequency blocks being continuous on a frequency axis;

means for detecting an unused channel among a plurality of channels contained in the selected block;

means for detecting an in-use channel among the channels when the unused channel is detected;

means for determining whether a second group to which a device which is using the detected in-use channel belongs is the same as the first group; and means for assigning the detected unused channel as a channel for communication with the radio terminal device when the in-use channel fails to be detected or it is determined that the second group is the same as the first group.

* * * * *